United States Patent [19]

van Zeggeren

[11] Patent Number: 5,121,097
[45] Date of Patent: Jun. 9, 1992

[54] SYSTEM FOR PREVENTING FRAUD IN THE USE OF A TAXIMETER

[75] Inventor: Wilhelm A. van Zeggeren, Bleiswijk, Netherlands

[73] Assignee: Locs B.V., Leiden, Netherlands

[21] Appl. No.: 423,967

[22] Filed: Oct. 19, 1989

[30] Foreign Application Priority Data

Oct. 21, 1988 [NL] Netherlands ............. 8802602

[51] Int. Cl.⁵ ........................... G08B 21/00
[52] U.S. Cl. .................... 340/434; 340/438; 364/467
[58] Field of Search ........... 340/434, 438, 459, 666, 340/667; 346/15-17; 364/466, 467; 180/288

[56] References Cited

U.S. PATENT DOCUMENTS

| | | | |
|---|---|---|---|
| 3,343,624 | 9/1967 | Shaheen | 340/434 X |
| 3,541,343 | 11/1970 | Butler | 180/288 X |
| 4,001,777 | 1/1977 | Alexander | 340/434 |
| 4,389,563 | 6/1983 | Ricard | 364/467 X |
| 4,476,461 | 10/1984 | Carubia | 340/667 |
| 4,744,239 | 5/1988 | Kyrtsos et al. | 340/438 X |
| 4,835,719 | 5/1989 | Sorrells | 364/466 X |

FOREIGN PATENT DOCUMENTS

| | | |
|---|---|---|
| 0382031 | 12/1986 | Austria . |
| 0060701 | 9/1982 | European Pat. Off. . |
| 2630218 | 1/1978 | Fed. Rep. of Germany . |
| 3302184 | 7/1984 | Fed. Rep. of Germany . |
| 2579747 | 10/1986 | France . |
| 8403161 | 8/1984 | PCT Int'l Appl. . |
| 1602273 | 11/1981 | United Kingdom ............. 364/467 |
| 2086577 | 5/1982 | United Kingdom . |

Primary Examiner—Jin F. Ng
Assistant Examiner—Brian R. Tumm
Attorney, Agent, or Firm—Kenyon & Kenyon

[57] ABSTRACT

A system for preventing fraud when using a taximeter that utilizes a stage for detecting a load condition in a taxi and for recording signals corresponding to the load and driving condition of the taxi and to whether the taximeter is switched on or off. The load detection stage is adapted to detect the load on at least the rear wheels (2b) of the taxi (1), and to detect a change from a zero point indicating the unloaded condition. Another stage detects the fuel consumption and emits a signal for adjusting, at least at intervals, the load zero point in correspondence with this consumption. The load detection stage (13) is adapted to emit an alarm signal when the detected load change exceeds a given threshold value while the taximeter (4) is switched on.

15 Claims, 2 Drawing Sheets

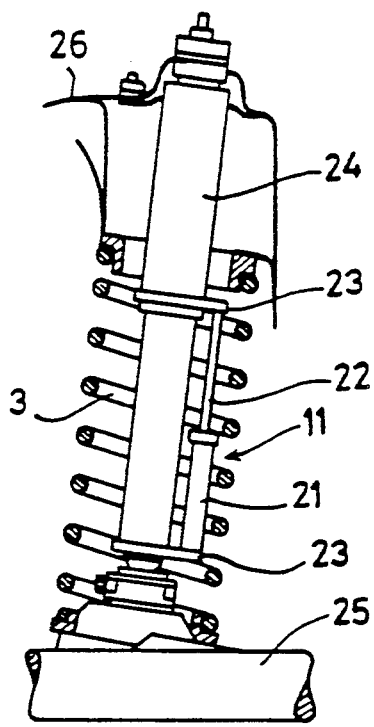
FIG: 2A.
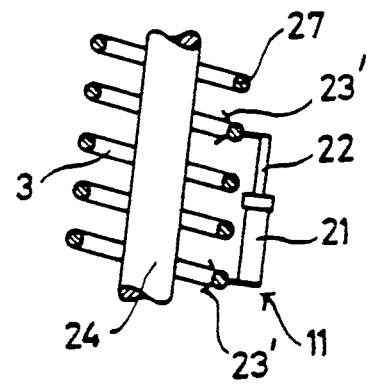
FIG: 2B.
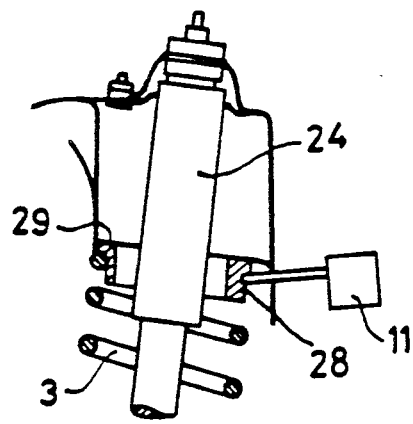
FIG: 3.

SYSTEM FOR PREVENTING FRAUD IN THE USE OF A TAXIMETER

FIELD OF THE INVENTION

The subject invention relates to systems for preventing fraud in the use of Taximeters by monitoring load and driving conditions.

BACKGROUND OF THE INVENTION

For preventing fraud in the use of a taximeter, different systems have been designed. These systems use, for determining loaded driving, weight sensors, in the seats of the taxi and/or door switches adapted to determine the opening of the doors. An example of such a prior system, is described in WO 84/03161.

Such systems are not always foolproof, since, for example, transporting goods in the luggage space cannot be determined, and, moreover, the sensors or switches provided in the seats and/or doors can be easily made inoperative.

Fraud is, in the first place, only possible when the taximeter is in the free condition, since, in the occupied condition, the fare is indicated and is entered into a daily totalizing counter or memory. A safety system should, therefore, be adapted to operate at least in the free condition of the taxameter.

The door and seat switches of the above-mentioned prior system indicate when passengers have got on or off the taxi, which is recorded as a pulse on a recording disc, whereas switching on the taximeter will give rise to a continuous recording. Moreover the velocity and distance are recorded on the disc. From a comparison of the various traces recorded on a daily disc, tampering or too much unoccupied driving can be derived, but this is time-consuming. In this prior system, a protection against loaded driving without switching on the taximeter is present, in which case the fuel supply towards the engine is shut-off. However, this is undesirable since, then, the taxi may come to a standstill at a dangerous point. This shut-off can be cancelled by means of a key, e.g. in the case of driving at an agreed price, but this can, again, lead to improper use, and always requires a careful examination of the recording discs, which often cannot provide a very accurate indication of fraud.

These disadvantages of the prior system make it unsuitable for protecting a taxi company completely against fraud. It is an object of the invention to provide a system which can ensure such a protection.

SUMMARY OF THE INVENTION

The system of the invention provided with means for detecting the load condition of the taxi and for recording signals in correspondence with the load and driving condition of the taxi and whether the taximeter is switched on or off, is characterised in that the load detecting means are adapted to detect the load of at least the rear wheels of the taxi and for detecting a change thereof in respect of a zero point indicating the unloaded condition, in that, moreover, means are present for detecting the fuel consumption and for producing a signal for adjusting the load zero point at least at intervals in correspondence with said consumption, and in that the load detecting means are adapted for producing an alarm signal when the detected load change exceeds a given threshold value without the taximeter being switched on.

The adjustment of the load zero point can be effected in various ways, such as by means of a fuel consumption or level meter, or by measuring the axle load at a standstill of the taxi, if said measurement is smaller than the preceding one, and, in particular, the difference can be compared with the difference indicated by the consumption or level meter, and said difference, can furthermore, be related to the measured covered distance in order to determine whether tampering with the fuel has taken place.

Preferably the measurement of the axle load takes place during a standstill of the taxi, since, during driving, an irregularly fluatuating load will be measured because of the continuous movements of the axle.

When filling up the fuel supply, a new zero resetting will take place which is unambiguous since, then, the taxi is at a standstill and an absolutely correct load measurement takes place. This zero resetting can be initiated, in particular, by opening the filling opening of the fuel tank.

Moreover the system can be provided with an element for inserting a card with data pertaining to the driver, and by inserting said card the first zero resetting takes place, and, in particular, this card can be provided in a known manner with a magnetic trace on which alarm signals noting loaded driving with the meter switched off can be recorded.

In contrast to the prior systems, it can also be determined now that the taxi is used for transporting goods. The weight threshold can, then, be chosen very low, so that also the transport of a child will be considered as a load.

The load sensors of this system can be constructed in various manners, depending on the type of spring suspension and of the fact whether installation thereof takes place in the factory or later, and in particular as pressure sensors to be provided in a suitable point of the spring mounting or in a hydraulic or gas spring, or as displacement sensors adapted to detect the axle displacement. In a particular embodiment of the latter the extremities of the sensors are provided with spring clamps each adapted to be fixed on a turn of a helical spring.

BRIEF DESCRIPTION OF THE DRAWINGS

The invention will be elucidated below in more detail by reference to a drawing, showing in:

FIGS. 2A and 2B two embodiments of a load sensor constructed as a displacement sensor; and FIG. 3 sensor constructed as a pressure sensor.

DETAILED DESCRIPTION OF THE INVENTION

Figure 1:
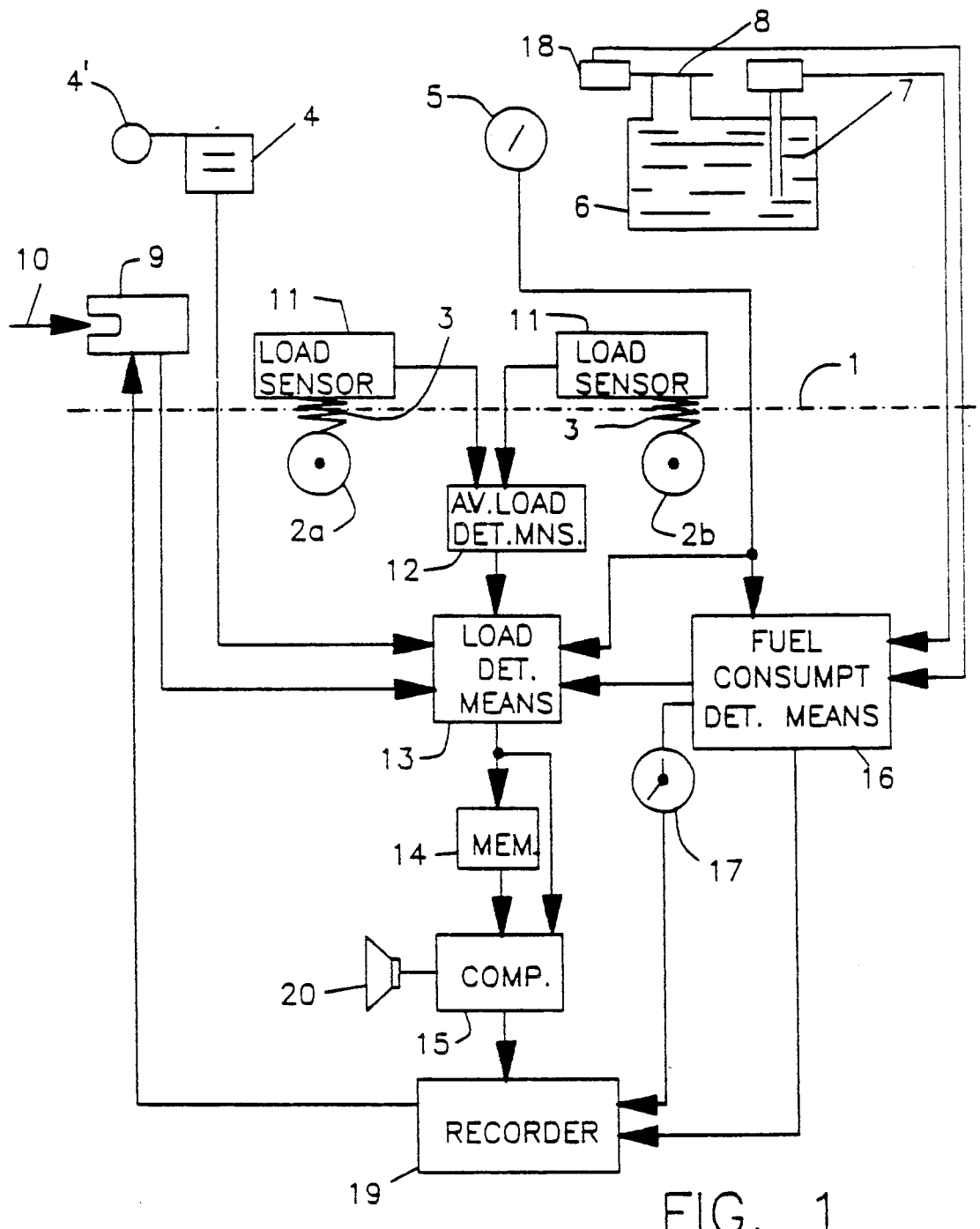
FIG. 1 a highly simplified diagrammatical representation of the system according to the invention.

FIG. 1 shows a highly simplified diagrammatical representation of the system according to the invention. The interrupted line 1 represents a taxi with the normally present parts which are relevant for the present purpose, such as wheels 2a and 2b and associated springs 3, a taximeter 4 with free/occupied switch 4', a speed/distance indicator 5, and a fuel supply tank 6 with a level meter 7 and a filling opening 8. This system can also comprise a sometimes already present apparatus 9 for inserting a driver identification card 10 which, in particular, can be adapted for recording, on a magnetic track on this card, of data determined by the system.

As will be described below, at least the rear wheels 2b or the springs thereof are provided with load sensors 11, the output of the sensors 11 being connected with a stage 12 for forming the average of the load determined by the individual sensors. Preferably also the front wheels 2a are provided with such sensors 11.

Furthermore the system comprises a plurality of electronic circuits for processing signals originating from these sensors 11 and from other elements such as the taximeter 4, the speed indicator 5, the level meter 7 and the apparatus 9, and at least for a part use can be made thereto of a microprocessor. The various stages of the system of FIG. 1 serve, in the first place, for elucidating the operation of this system, which operation can be obtained, in practice, also in a different manner when using a microprocessor.

The stage 12, the taximeter 4, the apparatus 9 and the speed indicator 5 are connected with a load measuring stage 13, and its output is connected with a memory 14 which can store the last measured load, said output being, moreover, connected with a comparator stage 15 in which a subsequent measurement can be compared with the measurement stored in the memory 14. Moreover an input of the stage 13 is connected with the output of a stage 16 having inputs which are connected with the fuel level meter 7, the speed indicator 5 and a clock 17, and, moreover, the output of a sensor 18 which is, for instance, coupled with the cover of the filling opening 8, is also connected with an input of the stage 16.

The outputs of the stages 15 and 16 are, moreover, connected with a recording apparatus 19 which, if required, can also be coupled with the apparatus 9 if the latter is adapted for recording data on a magnetic track of a card 10. The stage 15 can, if required, be connected with an alarm device 20 adapted to emit an alarm signal.

Since the present system is, in the first place, intended for detecting whether transport of persons or goods takes place with the taxameter not switched on, this system needs, in principle, not to operate if the taximeter 4 is switched on. However, this system can be used for determining, under all circumstances, in which manner the taxi is driven and how large the ratio between loaded and unloaded driving is and the like, and, then, the coupling with the taximeter 4 can be used for making a distinction between authorised and unauthorised transport.

Since, during driving, the springs of the vehicle are irregularly loaded, it is difficult to obtain a pure load measurement during driving. The use of filters for removing regular impact loads from the measurements signal is, as such, possible, but the accuracy of the measurement can be impaired thereby. Therefore it is preferred to perform the load measurement exclusively when the taxi is at a standstill.

The system is, now, arranged for comparing during a standstill the load with the zero load formed by the weight of the vehicle, the driver and the fuel supply. When inserting a card 10 by the driver, the stage 13 performs the first zero adjustment which is stored in the memory 14. At each standstill this comparison is repeated. Since for taking in passengers or goods a standstill is required, any load change which is relevant for the present purpose can be detected in this manner, and a threshold value, for instance corresponding with the weight of a small child, can be adjusted for making a distinction between loaded and unloaded driving.

Since during driving the fuel supply decreases, the zero point should continually be re-adjusted in correspondence with the fuel consumption. This takes place by means of the stage 16, by means of which, during a standstill of the taxi when the fuel supply has settled, the level in the supply tank 7 can be detected. Moreover by comparing the cover distance detected by the indicator 5 with the time indicated by the clock 17, an evaluation of the consumption on the basis of the average consumption can be made which can be compared with the real consumption, and then it will also be possible to determine whether fuel has been illegally removed from the tank. A re-adjustment of the reference zero point for the consumption measurement when filling up the supply can, for instance, take place by switching over the stage 16 under control of the sensor 18, and then only a re-adjustment will take place if an increase of the supply has been detected.

The various measurement results can, for instance, be recorded magnetically in the stage 19, and in particular it can be recorded on the card 10 whether irregularities have been detected, so that, at the end of a working day of the driver when handing in the card it can be immediately determined that a closer examination of the recorded measurement results is necessary. Also during driving an audible or visible alarm can be emitted by the alarm device 20 in order to warn the driver that the system has detected an irregularity.

For the case that driving without the taximeter being switched on has legimately taken place, for example when driving at a fixed tariff, special switches can be present, and actuation thereof will, again, be detected by the recording stage 19, and, at the same time, it can be recorded over which distance and during which time this has taken place.

The load transducers 11 can be constructed in various ways, and this depending on the character of the suspension of the vehicle and of the fact whether these transducers can be built in in the factory or after be mounted later.

Figure 1A:
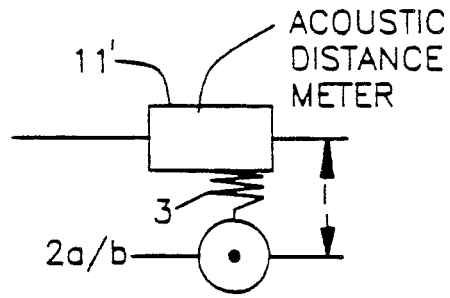
FIG. 1A a load sensor constructed as an acoustic distance meter.

FIG. 1A shows an embodiment of load sensor 11. Acoustic distance meter 11' measures the distance between suspended and non-suspended parts or the road surface to compute the load.

FIG. 2A shows a first embodiment of the transducer 11 in the form of a displacement transducer comprising two telescoping parts 21 and 22, each being connected with a ring 23, which rings, for instance as shown, are coupled with a fixed and movable extremity respectively of a shock absorber 24. The mutual displacement of the parts 21 and 22 can be detected in any suitable way, and can be conformed into an electric measurement signal as will be clear to an expert. Such a sensor detects the full displacement of the wheel axle 25 in question in respect of the frame 26 of the taxi 1, and, thus, can determine the load change very accurately. A draw-back of this transducer is that, for mounting it, the shock absorber 24 is to be disassembled, but when mounting in a factory this is no objection.

FIG. 2B shows a modified embodiment of this transducer, in which, instead of the rings 23, spring clips 23' are used which are clamped each on a turn of a helical spring 27. Such a transducer can be applied without much trouble on a spring. In this case also smaller transducers can be used, the displacement thereof then being a part of the total axle displacement.

FIG. 3 shows still another embodiment, in which the transducer 11 can determine the elastic deformation of a body 28 provided between the upper side of the spring 3 and an associated spring dish 29. A corresponding load measurement can be made in vehicles with hydraulic or gas suspension by measuring the pressure in the liquid or the gas.

It will be clear that also in the case of leaf or torsion springs adapted transducers can be used, and it is also possible to measure the load of a wheel in a different way, e.g. in the wheel bearing or in the tire. The transducers shown are, however, the simplest ones, and are, moreover, very dependable and accurate.

The load sensors 11 of FIG. 1 can also be replaced by other means adapted to measure the distance between the suspended and non-suspended parts or the road surface. In particular acoustic distance meters are suitable therefor, which, presently, can be inexpensively obtained. Interventions in the spring system can be avoided then. In the case of hydraulic or gas springs also pressure transducers such as bellows can be used which transform a pressure change into a distance change, which, in particular, can take place again acoustically.

In practice it has appeared not to be necessary to take into account the inclination of the vehicle since, as mentioned above, a given threshold value, for instance corresponding with the weight of a small child, is used, which threshold is sufficient for accommodating the variation in the load measurement as a consequence of road inclinations.

It will be clear that within the scope of the invention many modifications and additions are possible. As mentioned before, use can be made of a microprocessor. Microprocessors for recording various driving data in taxis, lorries and the like are already known, which can be extended for the present purposes, or which can be coupled with suitable auxiliary stages without difficulties.

I claim:

1. A system for preventing fraud when using a taximeter, comprising means for detecting the load condition of a taxi and for recording signals corresponding with the load and driving condition of the taxi and with whether the taximeter, is switched on or off, wherein the load detection means are adapted for detecting the load on at least the rear wheels (2b) of the taxi (1), and for detecting a change thereof in respect of a load zero point indicating the unloaded condition; means (16) are present for detecting the fuel consumption and for emitting a signal for adjusting, at least at intervals, the load zero point in correspondence with the fuel consumption.

2. The system of claim 1, wherein the load detection means (13) are adapted for performing a comparison with the existing load zero point during a standstill of the taxi.

3. The system of claim 1 wherein the means for detecting the fuel consumption (16) are adapted for detecting, during a standstill of the taxi, the fuel supply level in respect of a load zero point, and for re-adjusting this zero point when supplementing the fuel supply level.

4. The system of claim 3, characterised in that the means for detecting the fuel consumption (16) are coupled with means (5, 17) for determining the covered distance and for computing the fuel consumption over this distance, and for emitting an other alarm signal when exceeding a given threshold value of this consumption.

5. The system of claim 4, further comprising an element (9) for inserting a driver identification card (10) and for performing various resettings when inserting said driver identification card, and for recording, said driver identification card, at least one or both of said alarm signal and said other alarm signal.

6. The system of claim 1, wherein said load detecting means comprises load sensors (11) arranged at lest near each rear wheel suspension (2b), and further comprising means (12) for determining the average of the detected load.

7. The system of claim 6, wherein the load sensors (11) comprise pressure sensors (28) inserted in a suitable point of the spring system.

8. The system of claim 7, wherein each said pressure sensor comprises a transducer transforming the pressure into a displacement.

9. The system of claim 6, wherein the sensors (11) are displacement sensors adapted to detect a distance change caused by a load change.

10. The system of claim 9, wherein the displacement sensors (21, 22) are provided over at least a portion of a spring (27) of the associated wheel (2).

11. The system of claim 10, wherein the extremities of said displacement sensors (21, 22) are provided with clips (23') adapted to be clampedly fixed on a turn of said spring (27).

12. The system of claim 9, wherein the displacement sensors comprise acoustic distance meters.

13. An apparatus for detecting fraudulent use of a taximeter in a vehicle comprising:
  a detector means for generating a load zero point signal representative of a predetermined load at a vehicle's rear wheels and a load signal representative of changes in said predetermined load;
  a means for measuring changes in the vehicles fuel load and generating a fuel signal representative of the changes;
  a means for adjusting said load zero point signal in response to said fuel signal; and
  a means for recording said load zero point signal and said load signal.

14. The apparatus of claim 13, further comprising a means for emitting an alarm signal in response to predetermined changes in said load signal.

15. The apparatus of claim 13, wherein:
  said means for adjusting said load zero point signal periodically samples said fuel signal and adjusts said load zero point signal.

* * * * *